April 18, 1939. H. R. SCHUTZ 2,154,535
GLASS CIRCULATING APPARATUS
Filed Sept. 16, 1936 6 Sheets-Sheet 2
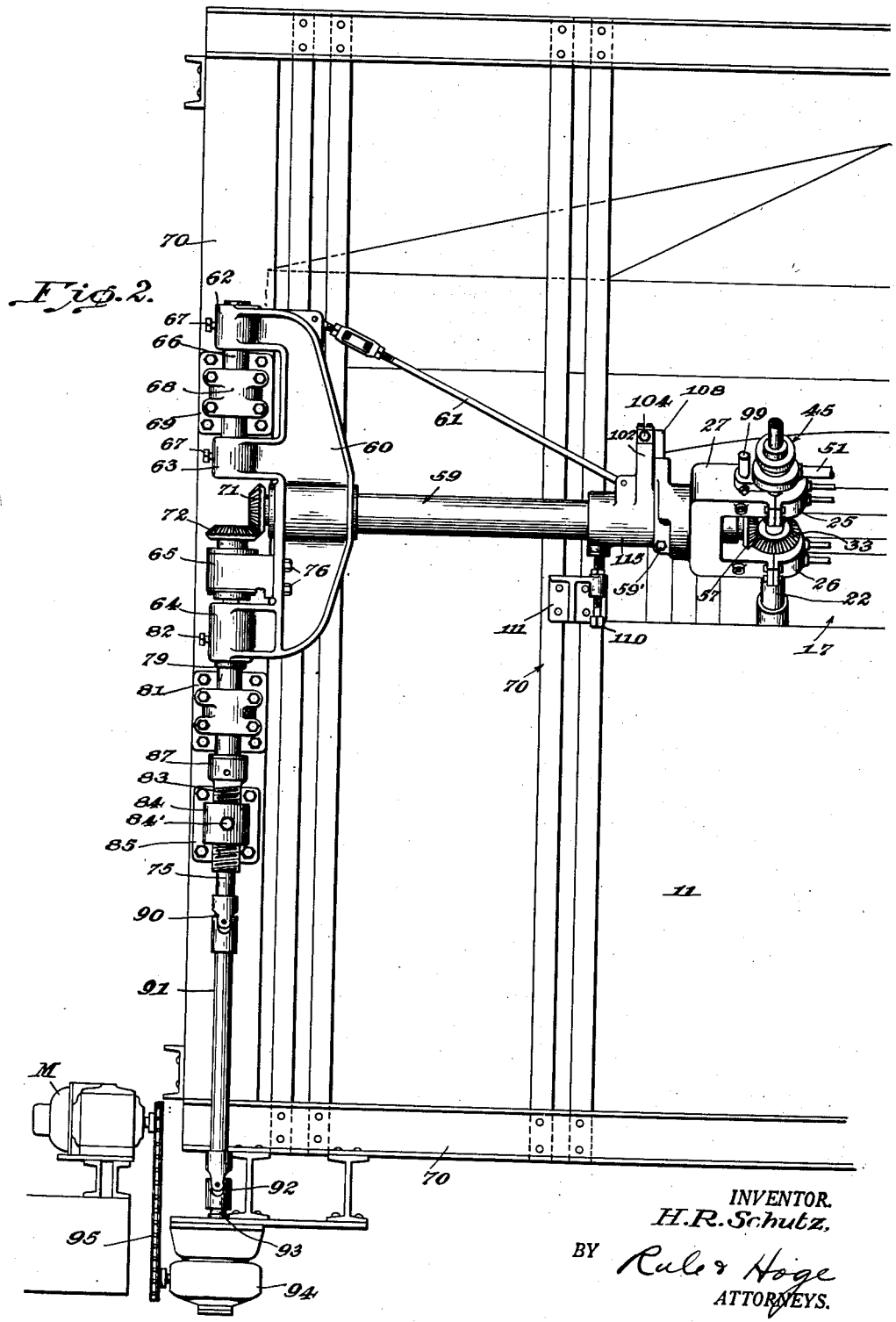
INVENTOR.
H. R. Schutz,
BY Rule & Hoge
ATTORNEYS.

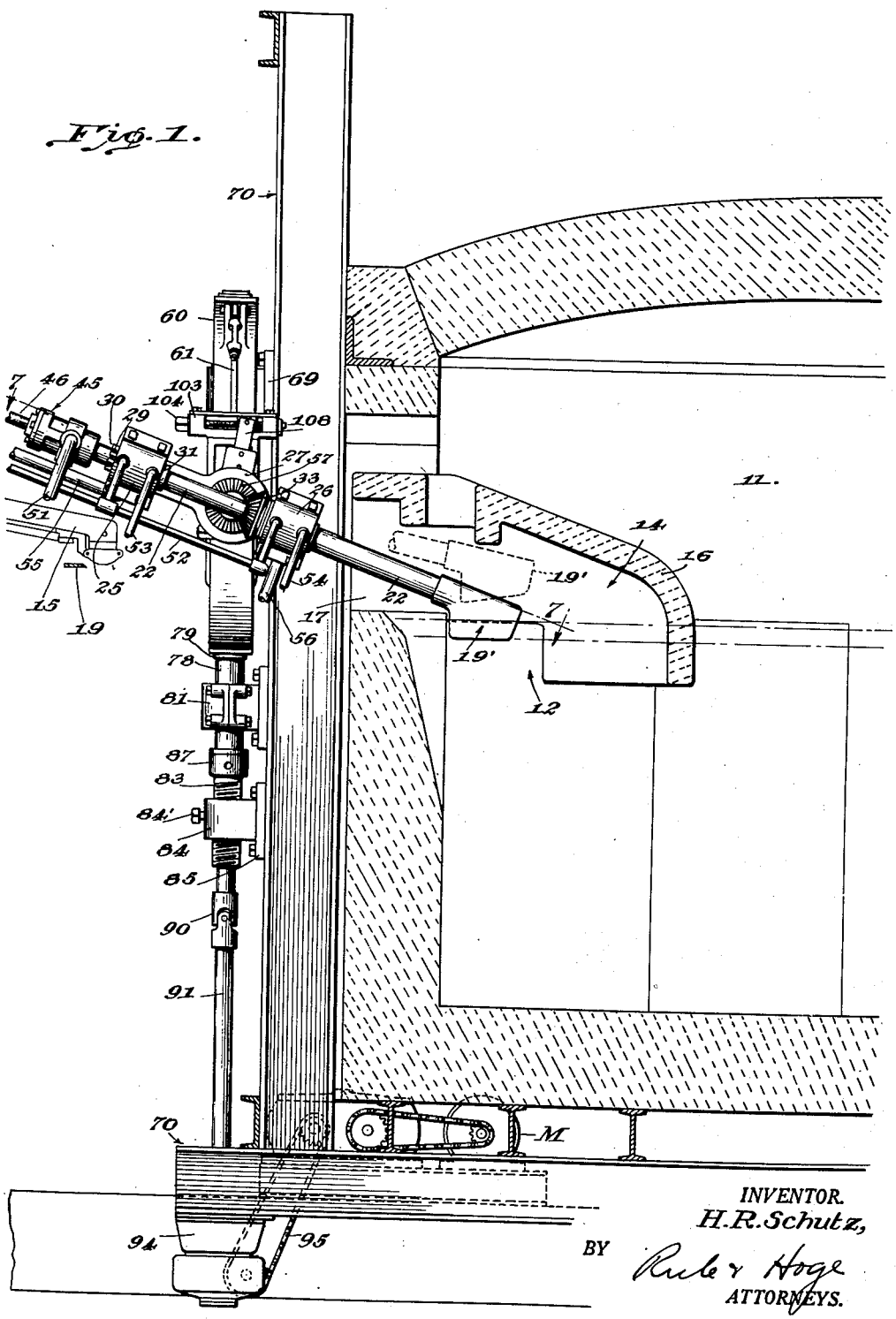

April 18, 1939.　　　H. R. SCHUTZ　　　2,154,535
GLASS CIRCULATING APPARATUS
Filed Sept. 16, 1936　　　6 Sheets-Sheet 3
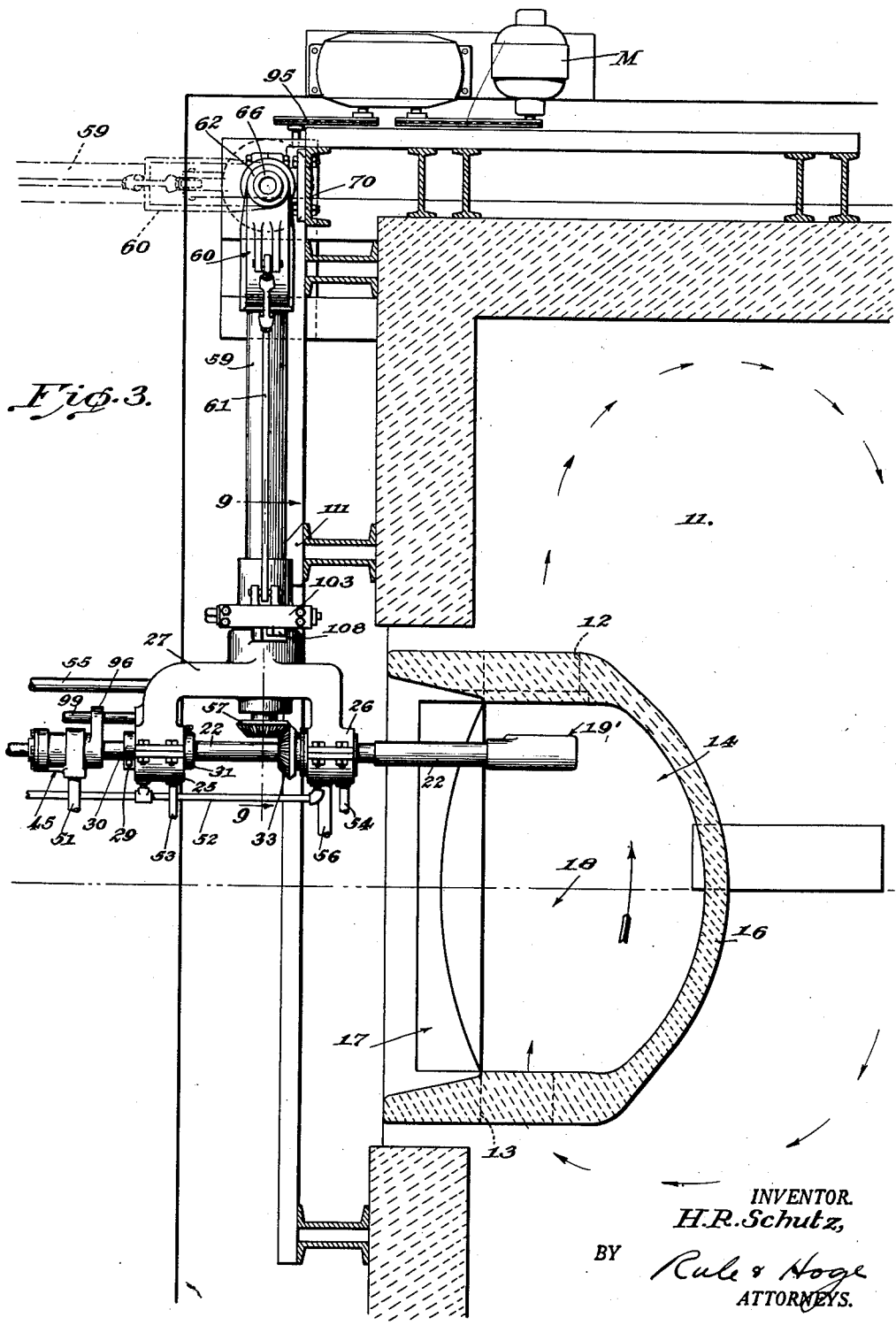

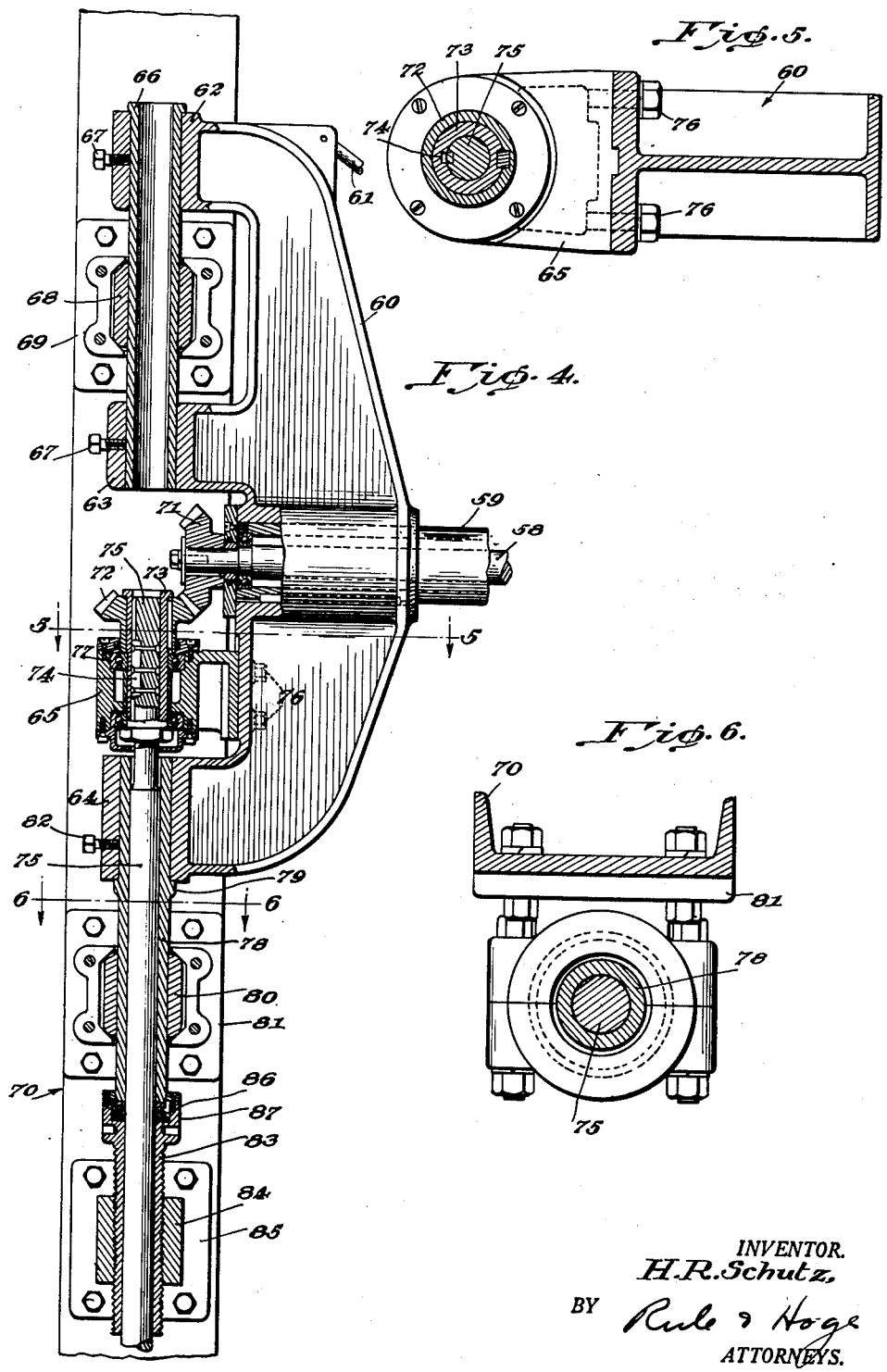

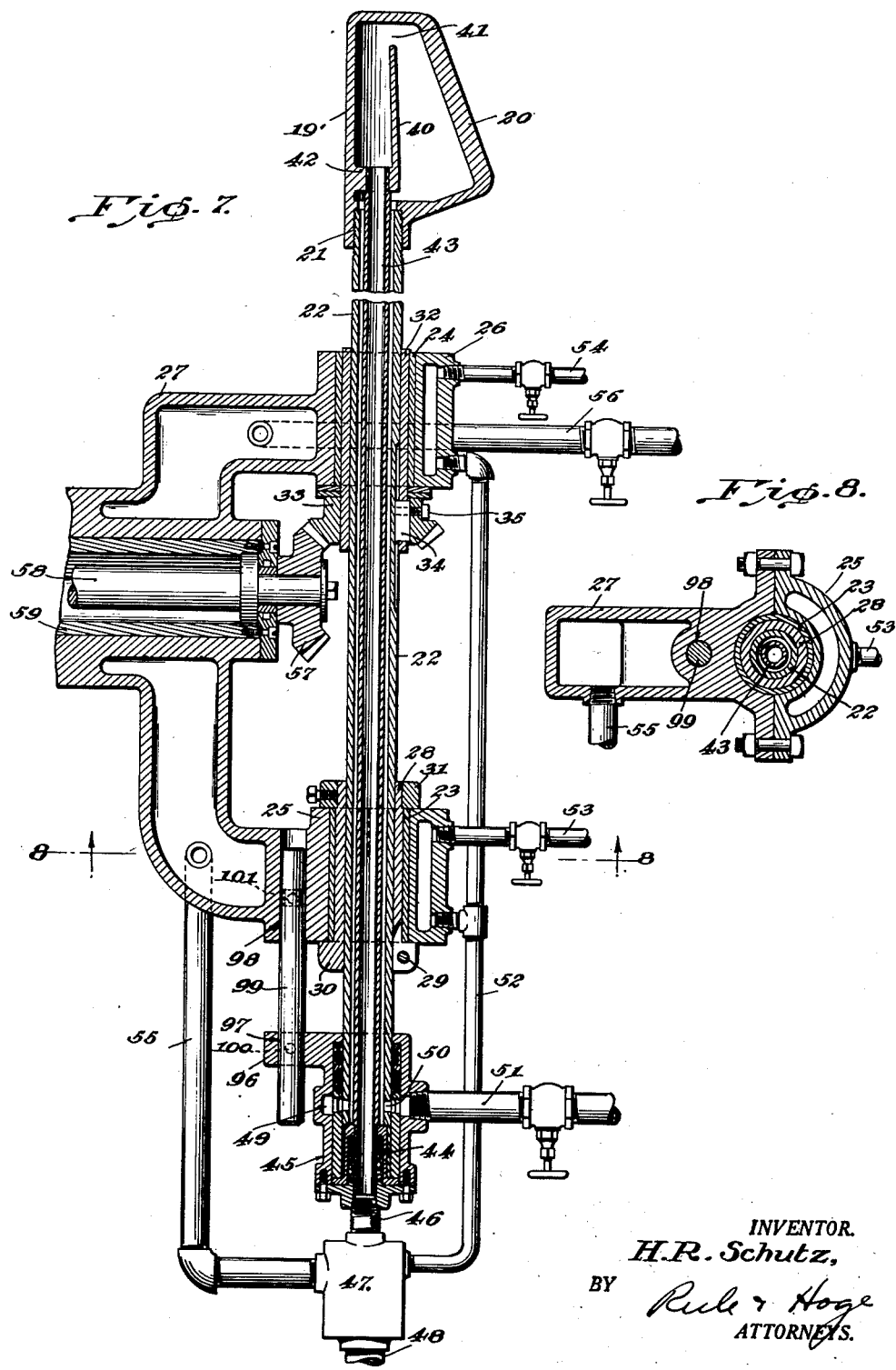

INVENTOR.
H. R. Schutz,
BY
ATTORNEYS.

Patented Apr. 18, 1939

2,154,535

UNITED STATES PATENT OFFICE 2,154,535

GLASS CIRCULATING APPARATUS

Harold R. Schutz, Toledo, Ohio, assignor to Libbey Glass Company, a corporation of Ohio Application September 16, 1936, Serial No. 101,117

12 Claims. (Cl. 49—56)

The present invention relates to improvements in apparatus for conditioning molten glass to prepare the glass prior to supplying the same to an apparatus for making glassware. More particularly, the invention relates to an apparatus for circulating molten glass contained in a gathering pool or forehearth past a gathering region or regions from which mold charges are repeatedly withdrawn by means of a suction gathering device which is periodically moved into gathering relation to the surface of the molten glass.

In the gathering of charges of molten glass from the surface of a gathering pool by a suction gathering device, the surface of the glass at the gathering station is chilled by contact with the relatively cold gathering means and with the shearing means which is employed to sever the withdrawn mold charges from the body of glass in the gathering pool. Chilling of the surface of the glass in the region of the gathering station is further augmented by the proximity of the gathering region to the opening of the furnace through which the suction gathering device periodically enters. Not only does the glass become chilled in the region of the gathering station through repeated contact with the relatively cold instrumentalities employed for gathering and severing the charges from the pool, but this cooling is attended by the presence of chilled spots produced by the "tails" or "cut-offs" of semi-hardened glass created in the severing operation which fall back into the pool and become entrained in subsequently gathered charges and cause imperfections in the finished ware.

The principal object of the present invention is to provide a practical means for removing such localized chilled glass from the region of the gathering station and for replacing such chilled glass with hot glass by causing a circulation or movement of the glass, especially the surface glass, contained in the gathering pool or forehearth. Such circulation of glass in the forehearth not only results in the displacement of the chilled glass by properly conditioned hot glass, but in a movement of the chilled glass inwardly of the pool where it is remelted and reassimilated by the main body of the glass in the furnace.

Instrumentalities for creating a circulation of glass in a gathering pool or forehearth have been suggested prior to this application. Some of these instrumentalities consist of impellers that are removed from the glass and reintroduced thereinto at each stroke thereof, thus creating in the glass the very surface imperfections which they are designed to eliminate. Devices of this nature have a tendency to subject the glass to intermittent impulses which produce variations in the level of the glass. Other devices that have been employed for creating a circulation of glass in the gathering pool or forehearth require that the structure of the forehearth or of the adjoining furnace (or even of the suction device employed for withdrawing charges of glass) be materially altered to accommodate the same.

Accordingly, it is a further object of the invention to provide a mechanism for creating a circulation of glass in a gathering pool or forehearth which will not require that any appreciable alterations be made to either the forehearth or adjoining furnace and which will not require an appreciable change in, or addition to, any of the usual types of suction machines which are used for gathering charges of molten glass from the gathering pool.

It is another object of the invention to provide an impelling device for maintaining a circulation of glass in the gathering pool which is not alternately exposed to the glass and atmosphere and which operates without producing any waves or variations of level in the glass.

Yet another object of the invention is to provide an impelling device which is mounted exteriorly of the furnace structure in order that the operative working parts thereof may at all times be accessible and exposed to view and in which the impelling instrument proper is capable of introduction into and withdrawal from the furnace opening for inspection without necessitating a cessation of the operation of the impelling apparatus.

A still further object of the invention is to provide a glass impelling apparatus of the type set forth above in which the impelling instrument proper, together with various bearings and other parts thereof, are adequately cooled by the circulation of water therethrough.

An additional object of the invention is to provide an impelling apparatus in which the impelling instrument is movable into, operable in, and is movable out of the furnace through the usual furnace opening from which the mold charges are withdrawn without interfering with the operation of the forming machine.

Other objects and advantages of the invention will become more readily apparent hereinafter.

In the accompanying drawings forming a part of this specification:

Fig. 1 is a side elevational view of a glass circulating apparatus manufactured in accordance with the principles of the present invention showing the same operatively associated with a furnace and forehearth construction. In this view a fragmentary vertical section of the furnace and forehearth construction is shown;

Fig. 2 is a front elevational view of the apparatus shown in Fig. 1;

Fig. 3 is a top plan view of the apparatus, the furnace being shown in section;

Fig. 4 is an enlarged fragmentary front elevational view, partly in section, of a yoke construction employed in connection with the present invention;

Fig. 5 is a sectional view taken substantially along the line 5—5 of Fig. 4;

Fig. 6 is a sectional view taken substantially along the line 6—6 of Fig. 4;

Fig. 7 is a sectional view taken substantially along the line 7—7 of Fig. 1;

Fig. 8 is a sectional view taken substantially along the line 8—8 of Fig. 7;

Figure 9:
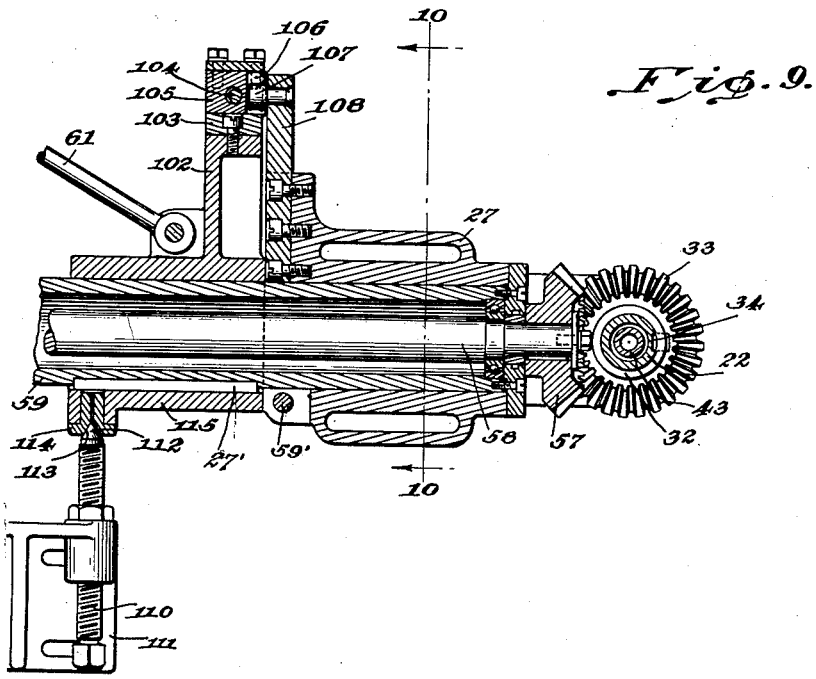
Fig. 9 is a sectional view taken substantially along the line 9—9 of Fig. 3.

Referring now to Figs. 1 and 3, a melting tank or furnace 11 is connected through openings 12 and 13 with a forehearth 14 adapted to contain a supply body of molten glass, the variation in level of which is indicated by the broken lines a—a and b—b. The forehearth 14 is of proper construction for supplying molten glass to the suction gatherer 15 of a glassware forming machine (not shown) and is provided with a partition 16 having its lower end extending below the level b—b of the glass and adapted to be immersed in the glass to seal off the forehearth from the fire space and prevent the furnace draft from interfering with draft conditions in the forehearth and vice versa.

The forehearth 14 is provided with an opening 17 at its front end through which the suction gatherer 15 may be inserted to gather the glass at the region 18. The gathering is provided with a shearing means 19 to sever the gathered mass from the glass in the forehearth. The suction gatherer and shear are shown somewhat diagrammatically, since they may be manipulated in any well known manner, the gatherer 15 being first projected into the forehearth over the gathering region 18 and then lowered into contact with the glass, after which suction is applied to the cavity of the gatherer to fill the same with glass. The gatherer may then be raised and the shearing means operated to sever the glass, after which the gatherer may be withdrawn from the forehearth to a discharging position where it may deliver its charge into a forming mold.

The glass circulating or stirring implement proper (Figs. 1 and 7) comprises a hollow head 19' which is preferably in the form of a bronze casting provided with a relatively thin triangular shaped impeller vane 20 which extends radially from the body of the casting. The head 19' is provided with a threaded opening 21 into which one end of an elongated tubular stem 22 or impeller shaft is threadedly received. The head 19' normally occupies an inclined position slightly above the surface of the glass in the forehearth in such a manner that axial rotation of the same will cause the vane 20 to dip into the glass in the manner of a paddle wheel and impel the glass through the opening 12 (Fig. 3) in the circuitous direction indicated by the arrows. The stem 22 extends obliquely from the glass through the opening 17 in the front wall of the forehearth and is journalled for rotation in a pair of antifriction bushings 23 and 24 which are mounted in respective aligned guides 25 and 26 carried by a hollow supporting yoke 27 positioned exteriorly of the furnace.

The stem 22 is capable of limited axial adjustment in the guides 25 in order that the head 19' may be adjusted relative to the gathering region 18 and relative to the level of the glass contained in the forehearth. Toward this end, a sleeve 28, split at one end, surrounds the stem 22 and is clamped thereto by means of a clamping nut and bolt assembly 29. The sleeve 28 provides a bearing surface for the stem 22 in the bushing 23 of the guide 25, and in order to prevent axial shifting of the sleeve 28, a flange 30 is formed on the split end thereof while a thrust collar 31 is disposed on the other end thereof. By loosening the nut and bolt assembly 29, it is obvious that limited axial adjustment of the stem 22 may be effected insofar as the guide 25 is concerned. A sleeve 32 having a bevel gear 33 mounted on one end thereof surrounds the stem 22 within the bushing 24. This sleeve, together with the gear 33, is keyed to the stem 22 as at 34. A set screw 35 serves to prevent axial shifting of the sleeve 32 on the stem, while the gear 33 itself serves to prevent shifting of the sleeve 32 in the bushing 24. Loosening of the set screw 35 will permit limited axial adjustment of the stem 22 as far as the guide 26 is concerned.

In order to cool the head 19' which is subjected to intense heat by direct contact with the molten glass and to cool the stem 22 which is subjected to the heat generated by radiation and contact with the hot furnace gases, means is provided for circulating water or other cooling medium through these elements. Accordingly, a baffle plate 40 extends across the interior of the hollow head 19' and is spaced as at 41 from the end thereof. A web 42 connects the baffle plate 40 to the wall of the head 19' and forms the sole support for the same. A conduit 43 which is spaced from the circumferential wall of the stem 22 extends axially therethrough and has one end thereof anchored in the web 42 in such a manner as to communicate with the space behind the baffle plate 40. The other end of the conduit 43 is journalled in a packing gland 44 disposed within a journal box 45 mounted on an end of the stem 22. This latter end of the conduit 43 communicates through a flexible tube 46 or conduit with a high pressure water distributing manifold 47 which is provided with a lead in conduit 48. Water supplied to the manifold 47 through the lead in conduit 48 passes through the journal box 45 and the axial conduit 43 and enters the impeller head 19' behind the baffle plate 40 from whence it passes around the end of the plate 40, through the space 41, and is returned to the journal box 45 through the space existing between the axial conduit 43 and the inner wall of the stem 22. The journal box is provided with an internal groove 49, with which a series of apertures 50 provided in the wall of the tubular stem 22 communicates, and into which the returning water passes and is discharged by means of a discharge conduit 51.

The journal box 45 is provided with a lateral flange 96. The flange 96 and guide 25 are provided with a pair of aligned axial bores 97 and 98 respectively. A guide pin 99 extends into the bores 97 and 98 and is adapted to be anchored therein by means of set screws 100 and 101 respectively. The guide pin 99 serves to maintain the journal box in proper axial position on the stem 22 in order that the internal groove 49 and apertures 50 may be brought into register.

The guides 25 and 26 are of hollow construction and a manifold conduit 52 leading from the manifold 47 communicates with the interior of both guides. Discharge conduits 53 and 54 respectively, serve to discharge the cooling water from the hollow guides 25 and 26.

The hollow yoke 27 is cooled by means of circulating water which passes from the manifold 47, through a conduit 55 to the interior thereof and which is expelled through a discharge conduit 56.

The stem 22 and impeller head 19' are rotated by means of the bevel gear 33 which is driven from a similar bevel gear 57 mounted on one end of a shaft 58 that extends centrally and axially through a sleeve 59 or carrier, an end of which is anchored in the body of the yoke 27 by means of a split skirt and clamping bolt assembly 59'.

Referring now to Fig. 2, the sleeve 59 has its other end similarly anchored centrally in a double yoke member 60 through which the shaft 58 projects. The double yoke member 60 is in the form of a casting having a pair of upper yoke guides 62 and 63 which are in alignment, and a pair of lower yoke guides 64 and 65 which are in alignment with each other and with the guides 62 and 63. The yoke 60 is supported for swinging movement in a horizontal plane on a king pin 66, the opposite ends of which are anchored by means of set screws 67 extending through the guides 62 and 63. The king pin 66 is tubular in form and is journalled for vertical sliding movement and for rotation in a guide 68 carried by a bracket or support 69 secured to one of the stationary supports 70 of the furnace 11.

It is apparent that the impelling head 19', together with all of its supporting and driving instrumentalities which are carried on the outer end of the sleeve 59, and which includes the yoke 27 and stem 22, are capable of being swung from an operative position within the furnace 11 to an inoperative position outside of the furnace where access thereto may be had for the purpose of inspection, replacement or repair of any of the parts thereof. In order to support these various instrumentalities in their operative position and to give to the apparatus when in use a degree of stability, while at the same time preventing accidental swinging movement of the impelling head and adjacent driving mechanism, a supporting and locking screw 110 carried by a bracket 111 mounted on the framework 70 of the furnace 11 near the furnace opening 17, is provided with a pointed end 112 (Fig. 9) adapted to engage a recess 113 formed in a nipple 114 positioned in the underneath side of a sleeve 115 which surrounds the sleeve 59 in the vicinity of the yoke 27 and which is keyed thereto as at 27'. Turning of the locking screw 110 in such a manner as to withdraw the pointed end 112 thereof from the recess 113 releases the impelling head 19' and associated driving instrumentalities in order that they may be withdrawn from the furnace 11 through the opening 17 into which these instrumentalities extend.

Figure 10:
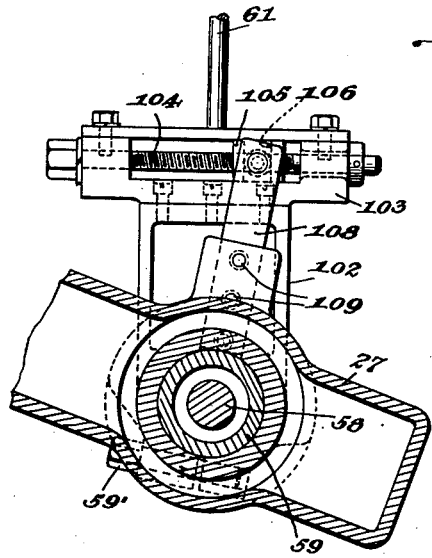
Fig. 10 is a sectional view taken substantially along the line 10—10 of Fig. 9.

Referring now to Figs. 2, 9 and 10, a tie rod 61 connects the yoke 60 with the sleeve 115 and serves to support the latter from the former and to in turn support the impeller proper and its associated parts when the same are swung outwardly from the furnace opening 17.

In order to adjust the inclination of the stem 22 which carries the impeller head 19' and to adjust the latter to the surface of the glass in the forehearth, the sleeve 115 is provided with an upstanding flange or web 102 upon the upper end of which there is disposed and secured a guide block cage 103. A screw threaded guide rod 104 extends transversely through the cage 103 and has mounted thereon a guide block 105 which is laterally movable in the cage 103. The block 105 is recessed as at 106 and a roller 107, carried by the upper end of a lever arm 108 which is secured by cap screws 109 to the yoke 27, is guided in the recess 106 of the block 105. It will be seen that turning movement of the rod 104 in one direction or the other will effect an adjustment of the inclination of the stem 22 either to adjust the impelling head 19' to the surface of the glass, or to align the head 19' with the furnace opening 17 as shown in dotted lines in Fig. 1 to permit withdrawal of the head and its associated instrumentalities from the furnace.

The projecting end of the shaft 58 which extends through the sleeve 59 and yoke 60 has mounted thereon a bevel gear 71 (Figs. 2 and 4) which meshes with a similar gear 72 mounted on a sleeve 73 that is keyed as at 74 to the upper end of a shaft 75 and upon which the sleeve 73 is vertically slidable. The shaft 75 extends through the lower yoke guide 64, which is integrally formed on the yoke member 60, and through the yoke guide 65 which is bolted as at 76 to the yoke member 60 for limited vertical adjustment thereon. The sleeve 73 which carries the gear 72 is rotatably supported in antifriction bearings 77 carried by the guide 65 and thus, inasmuch as the sleeve 73, guide 65, and yoke 60 maintain the same relative vertical spacing, regardless of the vertical adjustment of the swinging yoke 60, the gears 71 and 72 are held in constant mesh.

A sleeve 78, provided with an annular shoulder 79 upon which the weight of the yoke 60 is carried, surrounds the shaft 75 and extends into the lower guide 64. The sleeve 78 extends through a guide 80 carried by a bracket 81 mounted on the support 70 and is anchored by means of a set screw 82 to the yoke 60 and is supported for limited vertical adjustment in the apparatus upon a sleeve 83 which surrounds the shaft 75 and which is threadedly received in a guide 84 carried by a bracket 85 supported on the stationary support 70 of the furnace 11. A set screw 84' serves to lock the sleeve 83 in its adjusted position to prevent creeping of the same in operation. An antifriction bearing 86 for the shaft 75 is interposed between the sleeves 78 and 83 and is nested within a spanner head 87 by means of which the sleeve 83 is vertically adjusted. Any vertical adjustment of the sleeve 83 serves to effect vertical adjustment of the yoke 60, vertical motion or thrust being transmitted through the antifriction bearing 86, sleeve 83 and shoulder 79 to the yoke 60.

The lower end of the shaft 75 is connected through a flexible coupling 90 to a shaft section 91 which in turn is connected through a flexible coupling 92 to the driven shaft 93 of a gear reduction device 94 which is driven through a chain and sprocket mechanism 95 by an electric motor M. The motor M and gear reduction device 94 are suitably supported from the stationary framework 70 of the furnace 11 adjacent the bottom thereof.

Modifications may be resorted to within the spirit and scope of the appended claims.

I claim:

1. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontal shaft pivotally mounted for horizontal swinging movement about the axis of said first mentioned shaft, means for effecting driving connection between said shafts throughout the entire range of swinging movement of said horizontal shaft, an impeller shaft pivotally mounted for vertical swinging movement about the axis of said horizontal shaft, means for effecting driving connection between said impeller shaft and horizontal shaft throughout the entire range of swinging movement of said impeller shaft, an impeller mounted on one end of said impeller shaft, and means for driving said first mentioned shaft.

2. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontal shaft pivotally mounted for horizontal swinging movement about the axis of said first mentioned shaft, means for effecting driving connection between said shafts throughout the entire range of swinging movement of said horizontal shaft, means for elevating and lowering said horizontal shaft while maintaining said driving relationship, an impeller shaft pivotally mounted for vertical swinging movement about the axis of said horizontal shaft, means for effecting driving connection between said impeller shaft and horizontal shaft throughout the entire range of swinging movement of said impeller shaft, an impeller mounted on one end of said impeller shaft, and means for driving said first mentioned shaft.

3. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontally extending shaft pivotally mounted for horizontal swinging movement about the axis of said first mentioned shaft, means for effecting driving connection between said shafts throughout the entire range of swinging movement of said horizontal shaft, an impeller shaft pivotally mounted for vertical swinging movement about the axis of said horizontal shaft, means for effecting driving connection between said impeller shaft and horizontal shaft in the entire range of swinging movement of said impeller shaft, means permitting axial adjustment of said impeller shaft while maintaining said driving relationship with said horizontal shaft, an impeller mounted on one end of said impeller shaft, and means for driving said first mentioned shaft.

4. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontally extending shaft pivotally mounted for horizontal swinging movement about the axis of said first mentioned shaft, means for effecting driving connection between said shafts throughout the entire range of swinging movement of said horizontal shaft, means for elevating and lowering said horizontal shaft while maintaining said driving relationship, an impeller shaft pivotally mounted for vertical swinging movement about the axis of horizontal shaft, means for effecting driving connection between said impeller shaft and horizontal shaft throughout the entire range of swinging movement of said impeller shaft, means permitting axial adjustment of said impeller shaft while maintaining said driving relationship with said horizontal shaft, an impeller mounted on one end of said impeller shaft, and means for driving said first mentioned shaft.

5. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontal shaft pivotally mounted for horizontal swinging movement about the axis of said first mentioned shaft, means for effecting driving connection between said shafts throughout the entire range of swinging movement of said horizontal shaft, an impeller shaft pivotally mounted for vertical swinging movement about the axis of said horizontal shaft, means for effecting driving connection between said impeller shaft and horizontal shafts throughout the entire range of swinging movement of said impeller shaft, means for adjusting the inclination of said impeller shaft, an impeller mounted on one end of said impeller shaft, and means for driving said first mentioned shaft.

6. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontally extending shaft pivotally mounted for horizontal swinging movement about the axis of said first mentioned shaft from a position in close proximity to the front wall of the furnace to an extended position, means for effecting driving connection between said shafts throughout the range of swinging movement of said horizontally extending shaft, an impeller shaft pivotally mounted for vertical swinging movement about the axis of said horizontal shaft, means for effecting driving connection between said impeller shaft and horizontal shaft throughout the entire range of swinging movement of said impeller shaft, means for adjusting the inclination of said impeller shaft, means permitting axial adjustment of said impeller shaft, an impeller mounted on an end of said impeller shaft, and means for driving said first mentioned shaft.

7. The combination with a furnace provided with an opening in its front wall through which mold charges are withdrawn and delivered to a glassware forming machine, of a glass circulating mechanism comprising a vertically extending rotatable shaft positioned in close proximity to said front wall, a horizontally extending shaft pivotally mounted for horizontal swinging movement about the axis of said first mentioned shaft from a position in close proximity to the front wall of the furnace to a position remote from said front wall, means for releasably locking said horizontally extending shaft in said position of close proximity to the furnace front wall, means for effecting driving connection between said shafts throughout the range of swinging movement of said horizontally extending shaft, an impeller shaft pivotally mounted for vertical swinging movement about the axis of said horizontal shaft, means for effecting driving connection between said impeller shaft and horizontal shaft throughout the entire range of swinging movement of said impeller shaft, an impeller mounted on an end of said impeller shaft, and means for driving said first mentioned shaft.

8. The combination with a furnace provided with an opening in its front wall through which mold charges are withdrawn and delivered to a glassware forming machine, of a support, a carrier pivoted to said support for swinging movement toward and away from said opening, an impeller shaft mounted for rotation on said carrier and adapted to extend into said furnace when said carrier is moved toward said opening, an impeller mounted on one end of said impeller shaft, and means for rotating said shaft.

9. The combination with a furnace provided with an opening in its front wall through which mold charges are withdrawn and delivered to a glassware forming machine, of a support positioned adjacent said front wall, a carrier pivoted to said support for horizontal swinging movement toward and away from said opening, means for releasably locking said carrier in a position of close proximity to said wall, an impeller shaft mounted for rotation on said carrier and adapted to extend into said furnace when said carrier is in its locked position, an impeller mounted on one end of said shaft, and means for rotating said shaft.

10. The combination with a furnace provided with an opening in its front wall through which mold charges are withdrawn and delivered to a glassware forming machine, of a support positioned adjacent said front wall, a carrier pivoted to said support for horizontal swinging movement toward and away from said opening, an impeller shaft mounted for rotation on said carrier and adapted to extend into said furnace when said carrier is in close proximity to said front wall, said shaft being tiltable on said carrier to vary the inclination thereof, means for tilting said shaft, an impeller mounted on one end of said shaft, and means for rotating said shaft.

11. An apparatus for circulating molten glass within the forehearth of a refining furnace provided with an opening through which charges of molten glass are withdrawn comprising a vertically extending rotatable shaft positioned in close proximity to said furnace, a yoke member pivoted to a stationary support adjacent the upper end of said shaft, said yoke having a guide into which the upper end of said shaft extends, a sleeve carried by said yoke and projecting laterally therefrom, a second yoke member carried by the outer end of said sleeve, a horizontally extending shaft rotatably journalled in said sleeve, the upper end of said vertical shaft and the inner end of said horizontal shaft terminating adjacent each other and being provided with intermeshing gears, an impeller shaft rotatably journalled in said second yoke member and adapted to project through said furnace opening, the outer end of said horizontal shaft and the inner end of said impeller shaft terminating adjacent each other and being provided with intermeshing gears, means for tilting said second yoke member on said sleeve to adjust the inclination of said impeller shaft, and an impeller positioned on the outer end of said impeller shaft.

12. The combination with a furnace provided with an opening in its front wall through which mold charges are withdrawn and delivered to a glassware forming machine, of a support mounted for swinging movement about a vertical axis adjacent said front wall, a horizontal shaft rotatably journalled in said support for swinging movement therewith from a position in close proximity to said front wall to a position remote therefrom, means for rotating said shaft, an impeller shaft geared to said horizontal shaft and supported for swinging movement therewith, said impeller shaft being adapted to extend into said furnace through said opening when said horizontal shaft is in close proximity to said front wall, and an impeller mounted on said impeller shaft.

HAROLD R. SCHUTZ.